July 6, 1943.  R. A. DUNN  2,323,458
APPARATUS FOR TRANSPORTING MATERIALS
Filed March 25, 1942  2 Sheets-Sheet 1

INVENTOR.
Robert A. Dunn
BY Carlos G. Stratton
ATTORNEY.

July 6, 1943.                R. A. DUNN                2,323,458
          APPARATUS FOR TRANSPORTING MATERIALS
                  Filed March 25, 1942        2 Sheets-Sheet 2
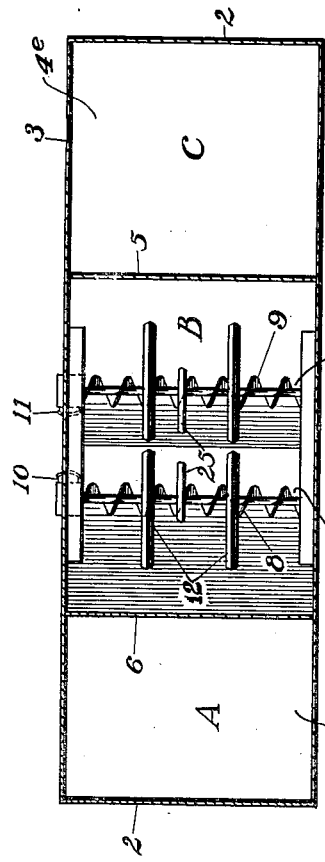
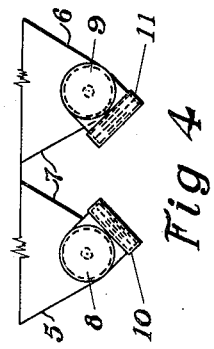
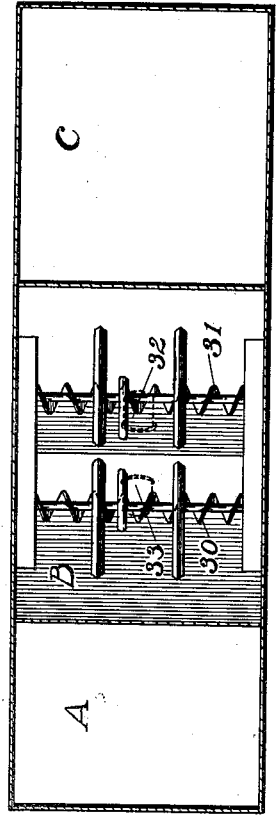
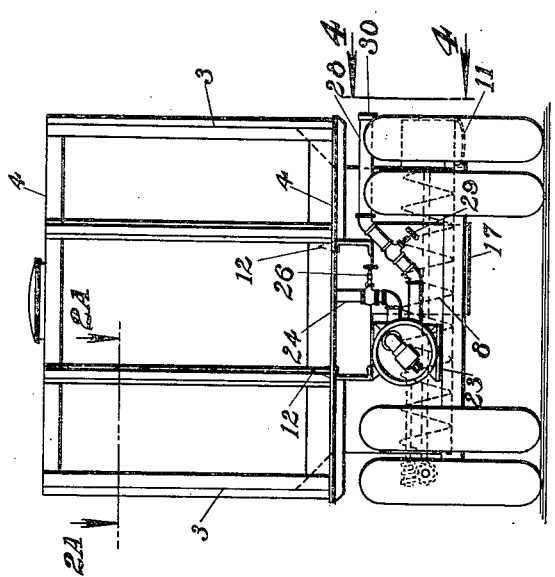
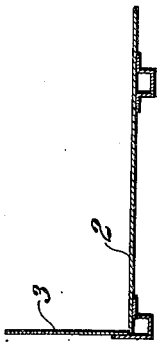
INVENTOR.
Robert A. Dunn
BY Carlos G. Stratton
ATTORNEY

Patented July 6, 1943

2,323,458

UNITED STATES PATENT OFFICE 2,323,458

APPARATUS FOR TRANSPORTING MATERIALS

Robert A. Dunn, Los Angeles, Calif.

Application March 25, 1942, Serial No. 436,086

7 Claims. (Cl. 214—83)

My invention relates to apparatus for transporting materials, more particularly, to apparatus for transporting simultaneously or alternately pulverized or granular materials and liquid or semi-liquid materials. Among the objects of my invention are:

To provide an apparatus of this character which may comprise the carrier unit of any type of vehicle such as truck, trailer, semi-trailer, or railroad freight car.

To provide an apparatus of this character which is divided into compartments isolated from each other and equipped with individual means for discharging its contents, whereby any intermingling or contamination of one material with another either while carrying the material or while unloading the material is entirely avoided.

To provide a multiple compartment apparatus of this character wherein the compartments are novelly arranged to make use of space ordinarily wasted in conventional carriers, so that the granular material and liquid carrying compartments may be large enough to justify economically the use of the apparatus to carry granular material or a liquid alternately with the other compartment empty; thus providing a material transporting apparatus which solves a number of difficult haulage problems, such as hauling ore from a mine and returning with petroleum products for use at the mine, or the hauling of constituents of cementing or asphalting operations, the first requiring hauling of the material alternately, the second requiring simultaneous hauling of material which must remain isolated until used.

To provide an apparatus of this character which greatly facilitates the hauling of bulk commodities, and eliminates the expense and waste occasioned in sacking or packing the commodities in small containers.

To provide an apparatus of this character which incorporates a novel and compact means for unloading pulverized material and liquid material either simultaneously or alternately all without intermingling.

To provide an apparatus of this character having a central hopper for granular or similar solid material, and end compartments for liquid which also serve as reinforcing means for the downwardly sloping sides of the hopper.

To provide an apparatus of this character wherein the hopper is provided with transversely extending compactly arranged conveyors for discharging the material therefrom which may be arranged to discharge at either side or the middle of the hopper, and which by reason of their compact, transverse arrangement permit faster unloading with a minimum of power.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 2 is a rear end view thereof.

Fig. 2A is an enlarged fragmentary sectional view through 2A—2A of Fig. 2 showing the body construction.

Fig. 3 is a substantially diagrammatical sectional view of my apparatus taken through 3—3 of Fig. 1 showing one arrangement of the conveyor units.

Fig. 4 is a fragmentary elevational view taken from 4—4 of Fig. 2 showing the dual discharge ends of the hopper.

Fig. 5 is a substantially diagrammatical sectional view similar to Fig. 3 but showing a modified arrangement of my conveyor units arranged for central discharge from the hopper.

Figure 1:
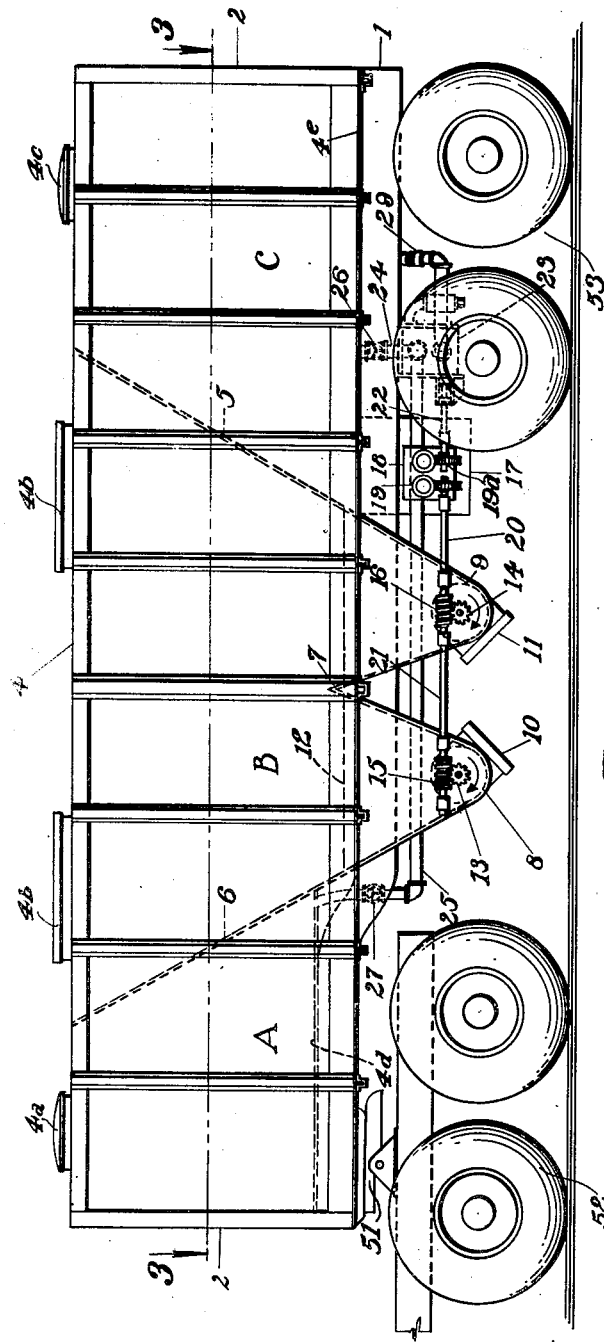
Fig. 1 is a side elevational view of my apparatus arranged as semi-trailer.

The particular embodiment of my invention illustrated is designed for use as a semi-trailer, but of course may be incorporated as the body of a truck, as a full trailer or the body of a railroad car. Two longitudinal girders or frame members 1 are suitably supported at their forward ends upon a conventional fifth wheel arrangement 51 carried by a traction unit 52 shown fragmentarily and substantially diagrammatically in Fig. 1.

The rear ends of the girders are supported by a conventional multiple wheel unit 53, likewise indicated diagrammatically, the girders being connected thereto by suitable spring arrangement omitted to simplify the illustration.

The girders 1 support a body or carrier unit in the form of a rectangular box having end walls 2, side walls 3, and a cover 4 having suitable hatches 4a, 4b and 4c. The walls are conventionally reinforced as shown in Fig. 2A. The carrier unit is divided by transverse partitions 5 and 6 which converge downwardly to form a central bin or hopper B and define with the end walls 2, end compartments A and C. The compartments A and C are provided with bottom members 4d and 4e which rest on the girders 1. The forward ends of the girders may be offset upwardly to pass over the traction unit 52 and the bottom 4d correspondingly elevated.

The partitions 5 and 6 continue downwardly below the frame members to form semi-cylindrical, transversely extending conveyor troughs 5a and 6a separated by a wall 7 of inverted V form, so that the longitudinal section of the central compartment or hopper B is substantially W shaped. The frame members 1 extend unbroken through the partitions 5 and 6 and the wall 7 just below its apex. The upper sides of the portions of the frame members exposed to the interior of the hopper B are provided with shields 12 which deflect the contents of the hopper to either side of the girder or frame members.

The conveyor troughs 5a and 6a are provided as shown in Fig. 3 with discharge spouts or chutes 10 and 11 arranged at either or both lateral extremities. Or, as illustrated in Fig. 5, the conveyor troughs may be provided with centrally located spouts or chute 32 and 33. In either construction the chutes are provided with suitable control gates.

If the chutes are arranged at the extremities of the conveyor troughs, as in Fig. 3, screw conveyors 8 and 9 pitched to feed from one extremity to the other are provided. If, however, central chutes 32 and 33 are provided, conveyors 30 and 31 are provided which are pitched left and right to feed from the extremities to the center of the troughs, as shown in Fig. 5.

The portions of the central hopper which project below the girders are preferably less in width than the normal width of the body, that is the depending portions are set inward from the sides 3. With either arrangement of screw conveyors and discharge spouts shown in Fig. 3 or 5, each screw conveyor is provided with a shaft which extends through the side of the hopper. The projecting ends of the two conveyor shafts receive worm gears 13 and 14 which are driven by worms 15 and 16 connected by a shaft 21. The worm, worm gear and shaft are all within the plane defined by the corresponding side 3 of the body as shown by dotted lines in Fig. 2.

Suitably suspended from the girders 1 immediately rearward of the hopper B and below the compartment C, is a power supply unit 17. This may be an internal combustion engine or an electric motor supplied from the power plant at the traction unit or other source, or may be merely suitable coupling arrangement for ready connection to an extraneous source of power maintained at the loading and unloading stations maintained for the carrier.

The power supply unit is provided with a transmission 18 including gear means 19 for driving a shaft 20 connected to the shaft 21 and the worms 16 and 15.

The transmission 18 is provided with other gear means 19a which is connected through a shaft 22 to a gear pump 23. The intake side of the gear pump 23 is connected by pipes 24 and 25 to compartments C and A respectively. Gate valves 26 and 27 are interposed in said pipes. Pipe 25 may project through the lower portion of bin B so that it may continue in a straight line from bin or compartment A to the gear pump. The transmission 18 is so arranged that the gear means 19 and 19a may be operated simultaneously or independently, so that the hopper B may be emptied simultaneously with compartments A and C, or either of them, or various compartments may be emptied individually.

The discharge side of the gear pump 23 is provided with a discharge pipe 28 which may extend to either side or to the rear of the body. A valve 29 is interposed in the pipe 28 and its extremity may be provided with a cap 30 when not in use.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. An apparatus for transporting materials, comprising: a body structure including longitudinally extending frame members, side, end, top and bottom walls defining a substantially rectangular shell carried by said frame members, intermediate transversely disposed downwardly converging partition members extending from the top wall beyond the normal bottom of said shell and below said frame members and forming a transversely extending conveyor housing, a discharge spout for said housing; a transversely disposed conveyor in said conveyor housing for feeding material into said discharge spout; wheel units for said body structure disposed forwardly and rearwardly of said conveyor housing; each partition and the corresponding end of said shell forming therebetween an end compartment of substantially the full height of the shell; a discharge pump connected with said end compartments; a power unit suspended from said body structure; and a power transmission means for connecting said power unit with said conveyor and said discharge pump.

2. An apparatus for transporting materials, comprising: a body structure including longitudinally extending frame members, side, end, top and bottom walls defining a substantially rectangular shell carried by said frame members, transversely disposed downwardly converging partition members extending from the upper side of said shell and continuing beyond the normal bottom of said shell and below said frame members, downwardly diverging walls between the converging partition members defining with the lower extremities of said partition members a pair of transversely extending conveyor housings, and discharge spouts for said conveyor housings, transversely disposed screw conveyors in said housing for feeding material into said discharge spouts; an end compartment formed between each partition and the corresponding end of said shell; a discharge pump connected with said end compartments; a power unit suspended from said body structure; and a power transmission means for connecting said power unit with said screw conveyors and said discharge pump.

3. An apparatus for transporting materials, comprising: a rectangular body structure forming three compartments, the centrally disposed compartment being substantially W-shaped in longitudinal section, its base portion forming a pair of transversely extending parallel conveyor housings having individual discharge spouts, the end compartments of said body structure being substantially trapezoidal in longitudinal section;

discharge pipes for the end compartments; a pump for withdrawing liquids through said discharge pipes; and a pair of screw conveyors disposed in said housings and extending from side to side of said middle compartment to feed material into said spouts.

4. An apparatus for transporting while separated especially solid material in powdered or granular form, and liquid materials, comprising: a rectangular body structure having transverse partitions dividing said body structure into a central compartment of substantially W-shaped longitudinal section, and end compartments of substantially trapezoidal longitudinal section, said end compartments reinforcing the ends of the central compartment and adapted to receive liquid materials, said central compartment adapted to receive solid material; transversely disposed dual conveyor means for discharging material from said central compartment; and pipe and pump means for discharging liquids from said end compartments.

5. An apparatus for transporting essentially solid material in pulverized or granular condition, and liquid material, comprising: a body structure of generally rectangular form and including top, bottom, side and end walls, transverse partitions therein extending between the side walls and converging downwardly from the top wall at points remote from the end walls of the body structure to form a central wedge-shaped bin for solid material, said partitions defining with the end walls of said body structure end compartments for liquids and forming the inner end walls of said end compartments, said central bin projecting below the bottoms of said end compartments; loading hatches in the top wall of said body structure and opening into the several compartments, discharge means extending from the lower portions of said end compartments; a scerw conveyor extending transversely of said body structure adapted to feed material toward a predetermined point in the bottom of said bin; and a gate controlled discharge spout at said predetermined point.

6. An apparatus for transporting essentially solid material in pulverized or granular condition, and liquid material, comprising: a body structure of generally rectangular form and including top, bottom, side and end walls transverse partitions therein extending between the side walls and converging downwardly from the top wall at points remote from the end walls of the body structure to form a central wedge-shaped bin for solid material, said partitions defining with the end walls of said body structure end compartments for liquids and forming the inner end walls of said end compartments, said central bin projecting below the bottoms of said end compartments; loading hatches in the top wall of said body structure and opening into the several compartments, a screw conveyor extending transversely of said body structure adapted to feed material toward a predetermined point in the bottom of said bin; a gate controlled discharge spout at said predetermined point; a discharge pump connected with said end compartments; a power unit carried by said body structure; and a power transmission means for connecting said power unit with said screw conveyor and said discharge pump.

7. An apparatus for transporting materials, comprising: a body structure including longitudinally extending frame members, side, end, top and bottom walls defining a substantially rectangular shell carried by said frame members, intermediate transversely disposed downwardly converging partition members extending from the top wall at points spaced from the end walls and continuing beyond the bottom wall of said shell and below said frame members and forming at the lower ends thereof a transversely extending conveyor housing, a discharge spout for said housing; said partition members forming with the end walls and compartments of substantially the full height of the shell; a transversely disposed conveyor in said conveyor housing for feeding material into said discharge spout; discharge means leading from said end compartments, and wheel units for said body structure disposed forwardly and rearwardly of said conveyor housing.

ROBERT A. DUNN.